F. B. DAVIS.
Soldering Device.
No. 200,437.    Patented Feb. 19, 1878.
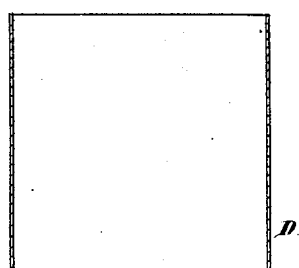
Fig. 1.
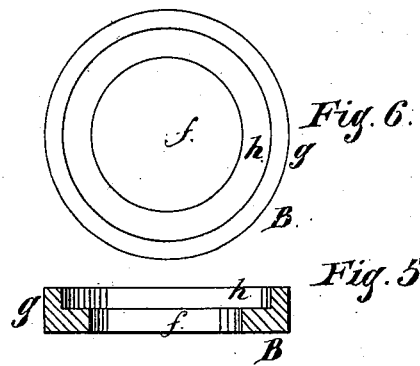
Fig. 6.
Fig. 5.
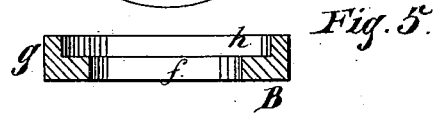
Fig. 3.
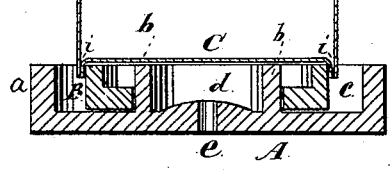
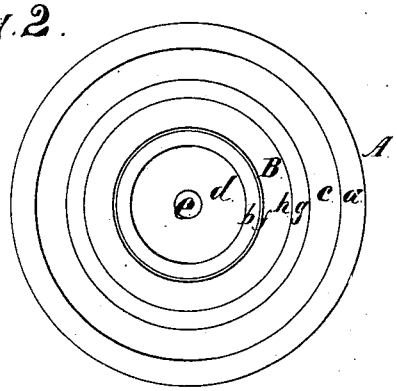
Fig. 2.
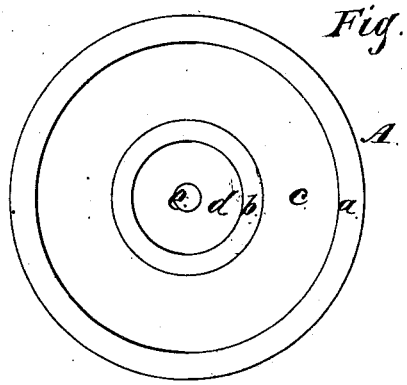
Fig. 4.
Witnesses:
Inventor:
Frederick B Davis
N. PETERS, PHOTO-LITHOGRAPHER, WASHINGTON, D. C.

UNITED STATES PATENT OFFICE.

FREDERICK B. DAVIS, OF CHICAGO, ILLINOIS.

IMPROVEMENT IN SOLDERING DEVICES.

Specification forming part of Letters Patent No. 200,437, dated February 19, 1878; application filed January 12, 1878.

*To all whom it may concern:*

Be it known that I, FREDERICK B. DAVIS, of the city of Chicago, Cook county, State of Illinois, have invented new and useful Improvements in Soldering Devices, of which the following is a full description, reference being had to the accompanying drawing, in which—

Figure 1 is a vertical section, showing the device with the can in position for soldering; Fig. 2, a top or plan view of the soldering device; Fig. 3, a vertical section, showing the device with the secondary plate removed; Fig. 4, a top or plan view of the same; Fig. 5, a vertical section of the secondary plate; Fig. 6, a top or plan view of the same.

The object of this invention is to provide a device by the use of which cans and other articles can be easily, rapidly, and tightly soldered, and which will effectually prevent the liability of the solder to spread over the surface of the article being soldered, and cause the solder to enter the joint to be closed, and to enable cans of various sizes and different shapes to be soldered on the same device; and its nature consists in providing a plate having a flange on its outer edge and a central base or support, so arranged as to leave a space between the flange and support for the reception of the soldering material, the central support having an air-chamber and an opening leading therefrom; and in providing another plate or support having an opening to fit the central support, and a flange on its outer edge.

In the drawings, A represents the main plate; B, the secondary or movable plate or support; C, the bottom of a can; D, the body of a can; *a*, the outside flange of the plate A; *b*, the central support or base; *c*, the receptacle for the solder; *d*, the air-chamber; *e*, the opening; *f*, the opening of the plate B; *g*, the outer flange of the plate B; *h*, the chamber of plate B; *i*, the flange on the bottom of the can.

The plate A, as shown, is of a circular form, and is made of cast-iron or other suitable material, having a border or flange, *a*, around its circumference, and a central core or support, *b*. Between the outer flange and the central support is a recess, *c*, which forms a receptacle for the solder. The central support *b* has a recess or chamber, *d*, within it, which forms an air-chamber, and from this chamber there is an opening, *e*, which extends through the plate A. The form and arrangement of these parts are shown in Figs. 3 and 4.

The secondary or movable plate or support B is also made from cast metal or other suitable material, and is provided with an opening, *f*, which fits over the central support *b*, and a flange or border, *g*, which extends the whole distance of its outer circumference.

The form of the circumference of the plate or support B is to be the same as that of the can with which it is to be used.

The base or support *b* may be of a size to fit the smallest sized cans, and the movable plates B are to be of different sizes, corresponding to the sizes of the different cans, and as many such plates as may be desired are to be provided.

The form of can shown in the drawing is circular, and consists of a body, D, of sheet metal, and a bottom, C, having a flange, *i*, over which the body of the can slips in manufacture.

In use the receptacle *c* is to be filled with some soldering material, and, if a small can is to be soldered, it is placed upon the support or base *b*, the bottom of the can resting on top of the support, and the flange *i* and body of the can thereon projecting into the soldering material, in which position the soldering material will enter the joint between the face of the flange and the face of the body, and tightly close the same, and such soldering material will only enter the joint to be soldered, and will not spread over the bottom of the can, by reason of the air-chamber *d*, and opening *e*, which prevent the soldering material from entering between the bottom and base and spreading over the bottom, as, when the can is lifted, the air-chamber prevents any suction.

If a large-sized can is to be soldered, a plate or support, B, of a size and shape corresponding to the size of the can, is to be slipped on over the support *b*, the bottom of the support B resting on the plate A in the recess *c*, leaving a space between its outer flange *g* and the flange *a*, for the reception of the solder, the same as before. After the ring or support B is in place the can is placed thereon, its bottom resting on the support or flange $g$, and is there soldered, as before described.

By using four or more plates attached together, four or more cans or other articles can be soldered at the same time.

The plate A is to be heated by gas in any suitable manner, to keep the soldering material in the proper condition for soldering.

After the can is soldered it is to be taken from the support and another can put in its place, so that the operation of soldering cans by this device is almost continuous.

By providing the central support with an air-chamber and an opening leading therefrom, it allows the easy removal of the can from the support, as such air-chamber breaks the suction between the bottom of the can and the support or base.

I am aware that soldering devices having a support for the can and a soldering-receptacle around the support have been used; but in all such devices the suction between the can and support renders it difficult to remove the can without having some of the soldering material sticking to the bottom. This objection is overcome by the air-chamber and opening therefrom.

What I claim as new, and desire to secure by Letters Patent, is—

1. The removable ring or plate B, provided with the flange $g$ and opening $f$, in combination with the base or support $b$, whereby the device can be adapted to solder cans of various sizes, substantially as specified.

2. The combination, in a device for soldering purposes, of the plate A, provided with the flange $a$, central support or base $b$, solder-receptacle $c$, central air-chamber $d$, and opening $e$, with the removable plate or support B, provided with the opening $f$ and flange $g$, substantially as and for the purposes specified.

FREDERICK B. DAVIS.

Witnesses:
O. W. BOND,
H. F. BRUNS.